UNITED STATES PATENT OFFICE.

CHARLES WALPUSKI, OF NEW YORK, N. Y.

PAPER-SMOOTHING COMPOUND.

SPECIFICATION forming part of Letters Patent No. 313,263, dated March 3, 1885.

Application filed August 1, 1884. (No specimens.)

*To all whom it may concern:*

Be it known that I, CHARLES WALPUSKI, of the city, county, and State of New York, have invented certain new and useful Improvements in Paper-Smoothing Compounds, of which the following is a specification.

This invention has reference to an improved composition for smoothing paper after ink or pencil marks have been erased therefrom, so that the roughened portion of the paper can be written upon without any spreading of the ink; and the invention consists of a paper-smoothing composition made of a mixture of pulverized clay, a suitable resin, and a suitable base or binding medium.

In preparing the composition one part of finely-pulverized clay is mixed with from three to six parts of finely-pulverized resin—such as colophony or any other equivalent resin—and with twenty-five parts of a suitable binding medium—such as glue, gum, &c. When the mass is thoroughly mixed, it is then pressed into proper shape, so as to be used either as a core inclosed by wood in the shape of a pencil, or as a separate smoothing stick, or in the usual adjustable pencil-cases. The resin serves to fill the pores of the paper where the marks have been erased, and imparts a smooth and glossy appearance thereto, so that the ink will not spread thereon.

Having thus described my invention, I claim as new and desire to secure by Letters Patent—

1. A composition of matter for smoothing paper, consisting of a suitable resin and a base or binding medium, substantially as set forth.

2. A paper-smoothing composition consisting of finely-pulverized clay, a suitable resin, and a binding medium, substantially as set forth.

In testimony that I claim the foregoing as my invention I have signed my name in presence of two subscribing witnesses.

CHARLES WALPUSKI.

Witnesses:
PAUL GOEPEL,
SIDNEY MANN.